(12) United States Patent
Wong et al.

(10) Patent No.: US 8,175,143 B1
(45) Date of Patent: May 8, 2012

(54) ADAPTIVE EQUALIZATION USING DATA LEVEL DETECTION

(75) Inventors: Wilson Wong, San Francisco, CA (US); Tin H. Lai, San Jose, CA (US); Allen Chan, San Jose, CA (US); Tim Tri Hoang, San Jose, CA (US); Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 729 days.

(21) Appl. No.: 12/037,284

(22) Filed: Feb. 26, 2008

(51) Int. Cl.
*H03H 7/30* (2006.01)
(52) U.S. Cl. ........ 375/232; 375/229; 375/230; 375/233; 375/284; 375/285; 375/316; 375/340; 375/345; 375/346; 375/350; 708/300
(58) Field of Classification Search .................. 375/229, 375/232, 233, 230, 284, 285, 316, 340, 345, 375/346, 350; 708/300
See application file for complete search history.

(56) References Cited

U.S. PATENT DOCUMENTS

| | | | |
|---|---|---|---|
| 4,066,977 A | | 1/1978 | Chambers et al. |
| 4,667,179 A | | 5/1987 | Law et al. |
| 6,043,766 A | * | 3/2000 | Hee et al. .................. 341/94 |
| 6,169,764 B1 | * | 1/2001 | Babanezhad ............... 375/233 |
| 6,870,404 B1 | | 3/2005 | Maangat |
| 7,065,134 B2 | * | 6/2006 | Papanikolaou et al. ....... 375/229 |
| 7,180,941 B2 | * | 2/2007 | Sivadas et al. ............... 375/232 |
| 7,336,729 B2 | * | 2/2008 | Agazzi ....................... 375/316 |
| 7,639,737 B2 | * | 12/2009 | Palmer ........................ 375/232 |
| 7,688,887 B2 | * | 3/2010 | Gupta et al. ................ 375/232 |
| 7,760,798 B2 | * | 7/2010 | Hidaka ........................ 375/232 |
| 7,764,757 B2 | * | 7/2010 | Hidaka ........................ 375/354 |
| 7,787,534 B2 | * | 8/2010 | Hidaka ........................ 375/229 |
| 7,801,208 B2 | * | 9/2010 | Hidaka ........................ 375/229 |
| 7,804,894 B2 | * | 9/2010 | Hidaka ........................ 375/230 |
| 7,804,921 B2 | * | 9/2010 | Hidaka ........................ 375/346 |
| 7,817,712 B2 | * | 10/2010 | Hidaka ........................ 375/230 |
| 7,817,757 B2 | * | 10/2010 | Hidaka ........................ 375/350 |
| 7,839,955 B2 | * | 11/2010 | Hidaka ........................ 375/316 |
| 7,839,958 B2 | * | 11/2010 | Hidaka ........................ 375/350 |
| 2001/0023177 A1 | | 9/2001 | Tanaka |

(Continued)

FOREIGN PATENT DOCUMENTS

JP        61-133713        6/1986

(Continued)

OTHER PUBLICATIONS

Choi, J.-S., et al., "A 0.18-μm CMOS 3.5-Gb/s Continuous-Time Adaptive Cable Equalizer Using Enhanced Low-Frequency Gain Control Method," *IEEE Journal of Solid-State Circuits*, (39)3:419-425 (Mar. 2004).

"Least Mean Squares Filter," http://en.wikipedia.org/wiki/Least_mean_squares_filter, last modified Feb. 21, 2008, accessed on Apr. 7, 2008.

*Primary Examiner* — Leon Flores
(74) *Attorney, Agent, or Firm* — Ropes & Gray LLP

(57) ABSTRACT

A method, and circuitry, for choosing the correct equalization curve in adaptive equalization uses a feedback loop in which the incoming high-speed serial data are digitized and deserialized for use in the remainder of the device, and also are used by an adaptive state machine to both extract the reference levels for digitization and to control the equalization curve. Detection of the reference level and selection of the equalization curve may be performed at a different rates to avoid interfering with one another. The state machine preferably is programmable. This is useful in any device, but is particularly well-suited for a programmable device, such as a PLD or other programmable integrated circuit device, where conditions may vary according a user logic design.

26 Claims, 4 Drawing Sheets

U.S. PATENT DOCUMENTS

| | | |
|---|---|---|
| 2004/0178851 A1 | 9/2004 | Ishida et al. |
| 2005/0095988 A1 | 5/2005 | Bereza et al. |
| 2007/0014344 A1 | 1/2007 | Maangat et al. |
| 2007/0071084 A1 | 3/2007 | Lai et al. |

FOREIGN PATENT DOCUMENTS

| | | |
|---|---|---|
| SU | 1658378 | 6/1991 |
| WO | WO 97/36372 | 10/1997 |
| WO | WO 02/05423 | 1/2002 |

\* cited by examiner

ADAPTIVE EQUALIZATION USING DATA LEVEL DETECTION

BACKGROUND OF THE INVENTION

This invention relates to adaptive equalization in a high-speed serial interface.

Many integrated circuit devices can be programmed. Examples of programmable integrated circuit devices include volatile and non-volatile memory devices, field programmable gate arrays ("FPGAs"), programmable logic devices ("PLDs") and complex programmable logic devices ("CPLDs"). Other examples of programmable integrated circuit devices include application-specific integrated circuits (ASICs), processors and microcontrollers that are programmable via internal or external memory. Programmable integrated circuit devices, such as programmable logic devices (PLDs) in particular, frequently incorporate high-speed serial interfaces to accommodate high-speed (i.e., greater than 1 Gbps) serial I/O standards. Typically, a PLD may have multiple high-speed serial interface channels. In use, different ones of such channels may have different characteristics, particularly if the user configures them for different standards, but also because of the length of the serial link involved and transmission conditions between the interface and the remote device. With multiple such channels all having different characteristics, the user is faced with the need to provide different amounts of equalization to compensate for attenuation. The amount of equalization of any particular setting in any particular channel may vary with backplane length, backplane type (e.g., backplane material), backplane aging, process conditions at the time of device manufacture, data rate, voltage, temperature, etc.

More generally, when a high-speed signal propagates through a transmission medium, not all of the frequency components get attenuated equally. In general high frequency components are attenuated more than low frequency components. The result is ISI (inter-symbol interference), which causes jitter in the ideal timing of a signal. Equalization is a method to boost each frequency component in accordance with its attenuation. Generally, high-frequency components are boosted more than low-frequency components.

In equalization, an equalization curve is selected with the goal of matching the transfer function of the equalization curve as closely as possible to the inverse of the transfer function of the transmission medium. The problem is that there are many possible combinations of equalization solutions and it requires a lot of time to determine the optimal setting using trial-and-error. An adaptive equalizer includes an equalizer and an adaptation engine which automatically chooses one of the possible equalization curves so that the combination of the two transfer functions is as flat as desired.

SUMMARY OF THE INVENTION

The present invention provides a method, and circuitry, for choosing the correct equalization curve in adaptive equalization.

Adaptive equalization according to the present invention uses a dual feedback loop in which the incoming high-speed serial data are digitized and deserialized for use in the remainder of the device, and also are used by an adaptive state machine to both extract the reference levels for digitization and to control the equalization curve. Detection of the reference level and selection of the equalization curve may be performed at different rates. The state machine preferably is programmable. This is useful in any device, but is particularly well-suited for a programmable device, such as a PLD or other programmable integrated circuit device, where conditions may vary according a user logic design.

Specifically, in accordance with the present invention, there is provided a method of equalizing high-speed serial input data in a high-speed serial interface. The adaptive equalization method includes equalizing the high-speed serial input data under control of a control signal to provide equalized output data, digitally processing the equalized output data to extract a reference level, and digitally processing said equalized output data and the reference level to generate the control signal.

An adaptive equalizer for performing the method, and a programmable integrated circuit device incorporating such an equalizer, also are provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

As discussed above, adaptive equalization is performed at high data rates in accordance with the present invention by converting incoming serial data to parallel digital form and processing them in a dual feedback loop including processing circuitry, which may be programmable, to determine the reference level and to select the equalization curve. The processing circuitry preferably is an adaptive state machine.

Figure 1:
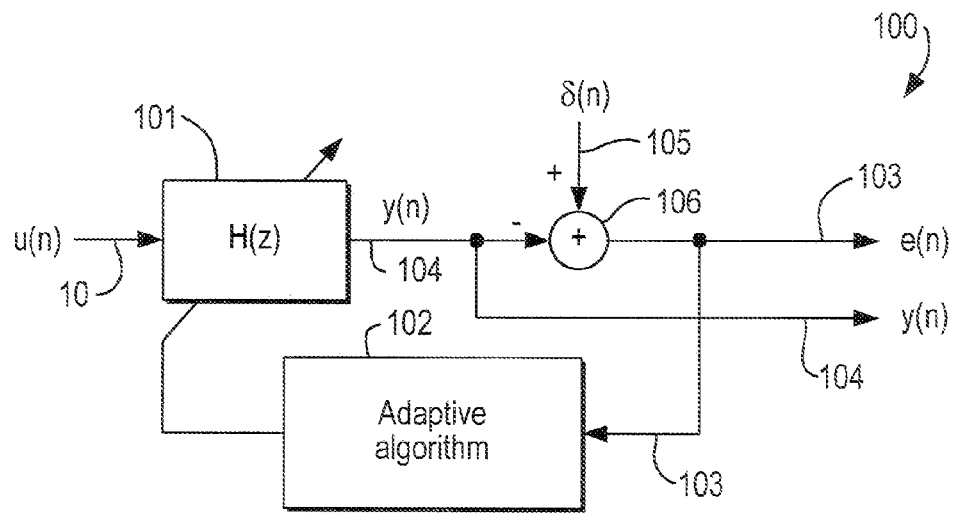
FIG. 1 is a diagram of a method or circuitry for adaptive equalization generally.

Adaptive equalization is well known and can be diagrammed generally as shown in FIG. 1, which can be viewed as either an adaptive equalization method or circuitry 100. In method/circuitry 100, a variable transfer function 101 operates on incoming signal 10. Adaptive algorithm 102 controls variable transfer function 101 based on an error signal 103 generated by comparing the equalized output 104 to a reference signal 105 at 106. Most or all adaptive equalization techniques, including that of the present invention, fall into this general class. However, the various techniques may be distinguished from one another based on, inter alia, how reference signal 105 is generated, and the nature of adaptive algorithm 102.

Figure 2:
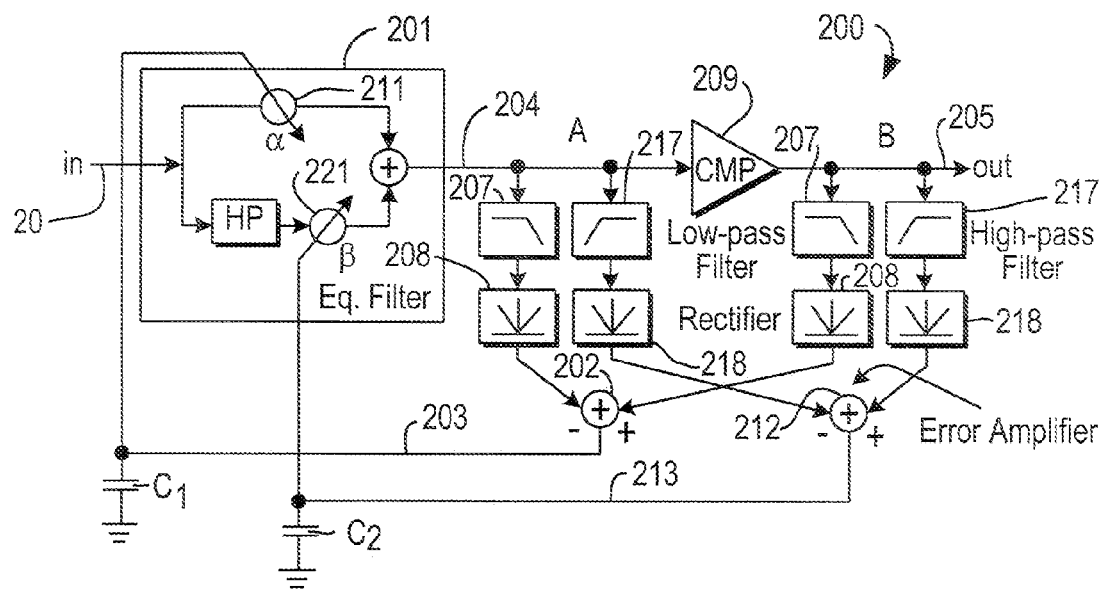
FIG. 2 is a diagram of a known analog method or circuitry for adaptive equalization.

One known analog adaptive equalization technique, referred to as the "LMS algorithm," is shown in FIG. 2. "In" signal 20 corresponds to input signal 10 of FIG. 1 and is the input to equalizer 201. Equalized signal 204 corresponds to equalized output 104, while signal 205 corresponds to reference signal 105. Error amplifier 202 generates a first error signal 203 from signals 204 and 205 after low-pass filtering 207 and rectification 208, while error amplifier 212 generates a second error signal 213 from signals 204 and 205 after high-pass filtering 217 and rectification 218.

In particular, error signals 203, 213 are generated by low-pass filters 207 and high-pass filters 217 from equalized signal 204 and reference signal 205, which is generated by the comparator 209. Comparator 209 generates an "ideal" or "comparison" edge from which the error signal is generated. Low-pass filters 207 and rectifiers 208, on the one hand, and high-pass filters 217 and rectifiers 218, on the other hand, respectively extract the low-frequency and high-frequency energy from signals 204, 205.

Equalizer 201 includes variable boosting of the low-frequency and high-frequency content using "knobs" 211, 221. Low-frequency boost knob 211 is denoted by $\alpha$, while high-frequency boost knob 221 is denoted by $\beta$. The low-frequency loop adjusts $\alpha$ until the low-frequency content of signal 204 matches the low frequency content of signal 205. Similarly, the high-frequency loop adjusts $\beta$ until the high frequency content of signal 204 matches the "ideal" edge of signal 205 generated by comparator 209.

This technique is difficult to design for high data rates and at the same time consumes a large amount of device area. For example, the low-pass and high-pass filters are usually metal capacitors and polysilicon resistors which contribute to the consumption of large amounts of area. The rectifiers also are challenging to design for high frequencies and are prone to random and systematic offsets. These effects become more pronounced as advances in semiconductor fabrication processes allow device feature sizes to become smaller.

Figure 3:
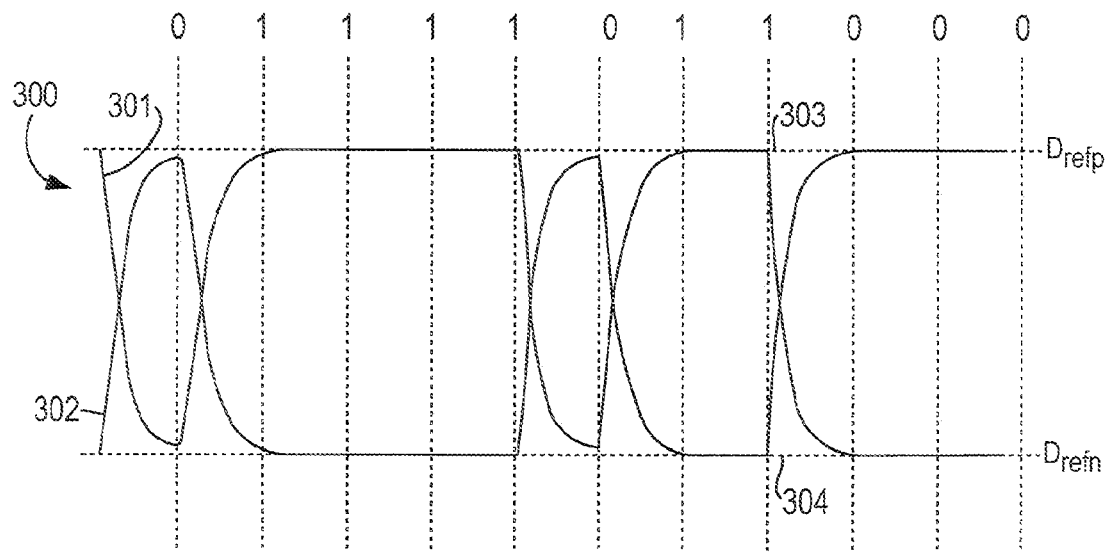
FIG. 3 is a graphical representation of a properly equalized differential signal.
Figure 4:
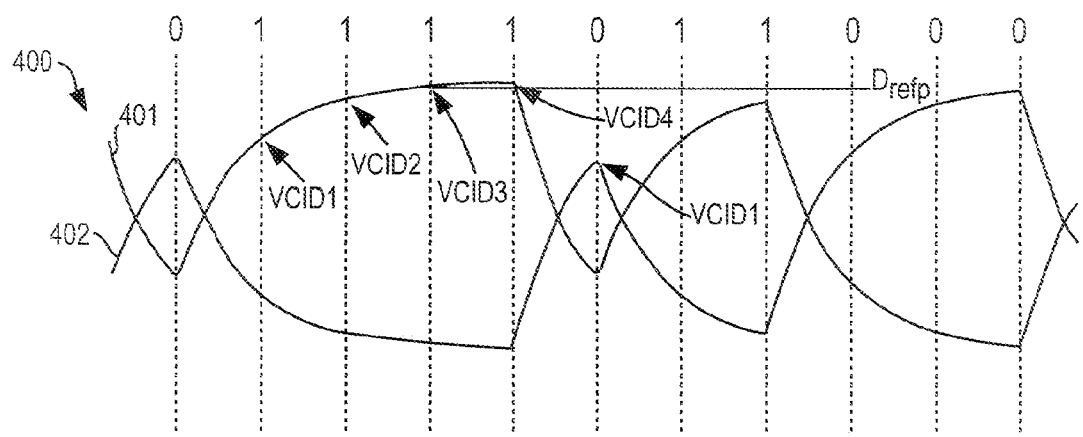
FIG. 4 is a graphical representation of an under-equalized differential signal.
Figure 5:
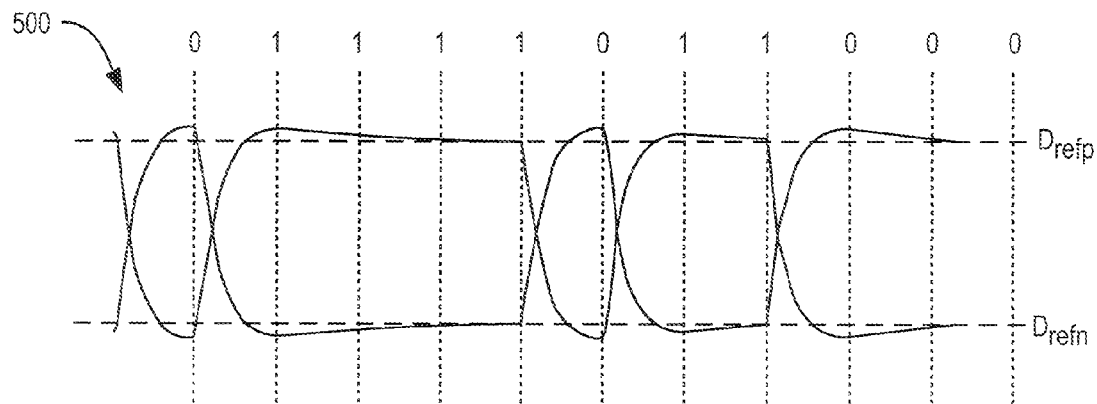
FIG. 5 is a graphical representation of an over-equalized differential signal.

Those difficulties may be overcome in accordance with the present invention by using digital techniques, which may be understood by reference to waveforms 300, 400 and 500 of FIGS. 3, 4 and 5, respectively, which show, respectively, properly equalized, under-equalized and over-equalized waveforms representing, as an example, a data stream 01111011000. As shown in FIGS. 3-5 and in the discussion that follows, the data stream is propagated differentially, but the invention applies as well to single-ended signals. In some of the discussion, reference is made to only one arm of the differential signal, and single-ended signals may be treated similarly.

In a digital signal, when the data have not changed for several unit intervals, the signal may be considered to be a low-frequency signal. When the data have just changed, the signal may be considered to be a high-frequency signal. Thus, in the examples of FIGS. 3-5, in the aforementioned 01111011000 sequence, by the third or fourth of the four consecutive 1's the data may be considered low-frequency data, just as they may be by the third of the three consecutive 0's. Similarly, at the first or fifth "1", or at the second or third "0", the data may be considered high-frequency data.

In properly equalized waveform 300 of FIG. 3, it can be seen that for both high-frequency data and low-frequency data, the signals reach the same level. That is, looking separately at each of the positive and negative "arms" 301, 302, respectively, of differential signal 300, in both high-frequency and low-frequency regions of either arm, the signal rises to the full voltage representing a "1" when that data value is "1" and falls to the actual voltage representing "0" when the data value is "0". Moreover, looking at both arms 301, 302 together, the high values of arms 301 and 302 are equal and the low values of arms 301 and 302 are equal. For a single-ended signal, one may consider either of arms 301, 302 as representative.

This can be compared to an under-equalized (of which completely unequalized is an extreme case) signal 400 as shown in FIG. 4. Once again, signal 400 is differential. As can be seen in either arm 401, 402, in the high-frequency regions, neither arm is able to fully reach the high or low value, whereas in the low-frequency regions the signal does reach those values. Therefore, in the high-frequency regions the signal value may not be detected correctly.

Finally, in an over-equalized signal 500 as shown in FIG. 5, the signal values in the high-frequency regions, as well as at the beginning of each low-frequency region, pass the high or low value. This may give rise to crosstalk and noise.

In accordance with the present invention, a received signal to be equalized may be digitized and processed in the digital domain to extract the target or reference signal level, and then to equalize the signal so that it reaches that level in both low- and high-frequency regions. Preferably, an adaptive state machine is used in a feedback loop to perform the digital processing, controlling both the reference level(s) (one reference for each arm in the case of a differential signal) and the amount of equalization boost so that the signal reach the reference level(s). Preferably, the target reference levels are the levels 303, 304 shown in the properly equalized waveform of FIG. 3 and denoted Drefp and Drefn for the positive and negative arms 301, 302, respectively.

Figure 6:
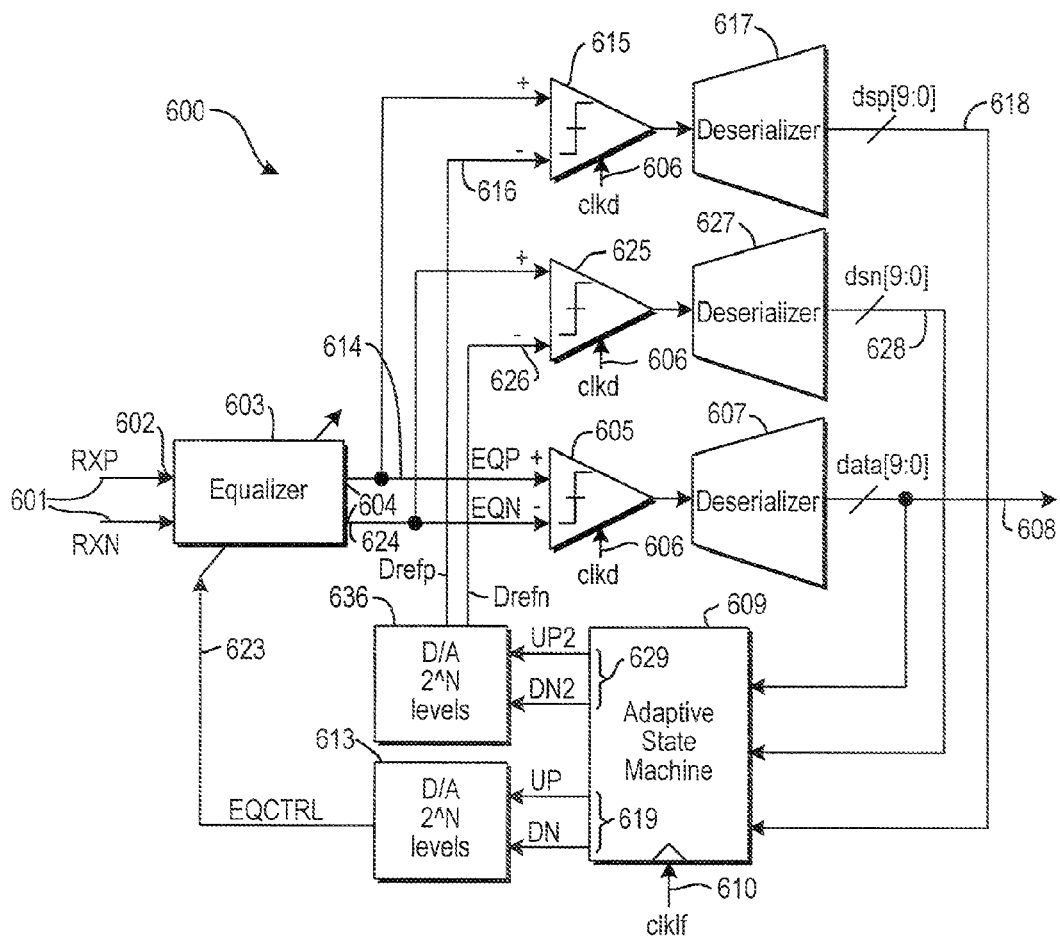
FIG. 6 is a diagram of adaptive equalization in accordance with an embodiment of the present invention.

One embodiment of an adaptive equalization architecture 600 according to the invention is shown in FIG. 6. In adaptive equalizer 600, a signal 601 is received at input 602 of variable equalizer block 603, and the equalized output 604 is digitized by slicer, or analog-to-digital converter, 605 based on data clock (clkd) 606 and then deserialized by deserializer 607 to provide parallel digital data 608 which is output for use elsewhere in the device of which adaptive equalizer 600 is a part. As shown, signal 601 is differential, but as discussed above, it also may be a single-ended signal (not shown).

The positive arm (EQP) 614 of equalized signal 604 also is digitized by slicer 615, based on data clock (clkd) 606, by comparison to reference signal (Drefp) 616 and deserialized by deserializer 617 to provide parallel positive digital signal (dsp) 618. Similarly, negative arm (EQN) 624 of equalized signal 604 also is digitized by slicer 625, based on data clock (clkd) 606, by comparison to reference signal (Drefn) 626 and deserialized by deserializer 627 to provide parallel negative digital signal (dsn) 628. In the case of a single-ended signal, the negative loop is not used.

Dsp and dsn signals 618, 628, along with output data signal 608, are input to adaptive state machine 609, which monitors all three signals and uses them, in accordance with programmed instructions, which preferably are user-programmable, to adjust dsp and dsn signals 618, 628 themselves, as well as to adjust equalization control signal (EQCTRL) 623 which controls the amount of gain or boost provided by equalizer block 603.

Specifically, adaptive state machine 609 outputs up/down (UP/DN) signals 619 which control digital-to-analog converter 613 which provides signal 623. Adaptive state machine 609 also outputs up/down (UP2/DN2) signals 629 which control digital-to-analog converter (DAC) 636 which provides Drefp and Drefn signals 616, 626.

By comparison to FIG. 1, signal 601 corresponds to signal 10, signal 604 corresponds to signal 104, signals 616, 626 correspond to signal 105, and equalizer block 603 corresponds to variable transfer function 101. Adaptive state machine 609, together with digital-to-analog converters 626, 636, replace adaptive algorithm 102.

To understand the operation of adaptive state machine 609, one can examine under-equalized waveform 400 of FIG. 4.

One can define VCIDN as the voltage level reached by the waveform after N consecutive identical digits (CID). For example, VCID3 is the value of the waveform after 3 CID. Taking the positive arm as an example, Drefp can then be defined as the level after some sufficiently high number of CID. This is also significant because it represents data which has a certain low-frequency content. It can be seen that the goal is to match the level of a single bit Drefp level after several CID. In FIG. 4, one can choose Drefp as the level after about 3 CID.

Thus, the first task to be performed by adaptive state machine 609 is to extract Drefp level 616 and Drefn level 626 from the received data. Once those levels have been extracted, the data can be compared to those levels to select the appropriate equalization to bring them up to those levels. Like the analog implementation of FIG. 2, this implementation according to an embodiment of the invention has a lower-frequency loop and a higher-frequency loop. One reason for having the two loops operate at different frequencies is to prevent the two different loops from interfering with one another, as discussed below. The operation of adaptive state machine 609 is timed by low frequency clock (clklf) 610, which may be a divided version of the full-speed system clock. In one embodiment, the divisor may be programmably selectable from among several choices (e.g., the first five or six powers of two).

In the loop to extract the reference levels (using extraction of Drefp as an example), the adaptive state machine may first record the data pattern of output parallel signal 608. Although in FIG. 6, signal 608 is shown as ten bits wide, the data width does not have to be ten bits, but can be any convenient width. However, adaptive state machine 609 preferably uses parallel data to reduce the processing speed requirements. At gigabit-per-second data rates, processing serial data would require much faster logic.

Adaptive state machine 609 preferably is programmed to check for a low-frequency (LF) pattern. For example, if as above one assumes that three CID indicates a low-frequency pattern, one may achieve the following result:

data: . . . 00101100100011011100 . . .
LF_det1: . . . 00000000000000000100 . . .

where "data" is signal 608 and LF_det1 is a signal that is asserted when three CID are detected and the values of the three CID are 1's. The number of CID required to indicate a low-frequency state may be made programmable, to allow detection of different patterns of low-frequency content. Moreover, instead of looking for a certain number of consecutive 1's adaptive state machine 609 could be made to look for a certain number of consecutive 0's, which might result in assertion of a signal LF_det0 (not shown).

Drefp may arbitrarily be set to start at the common mode voltage—i.e., the average of the two arms 614, 624 of equalized data 604. Adaptive state machine 609 also monitors output data 608 and parallel output dsp 618. If adaptive state machine 609 detects LF_det1=1 AND data=1 then it can observe parallel output dsp 618 from slicer 615, whose inputs are EQP 614 and Drefp 616. If data 608 are "1" and dsp 618 is "1", the adaptive state machine 609 may assert DN2=1, setting UP2=0, and causing Drefp 616 to be decreased, because the reference level is already at or above the desired data level. Conversely, if data 608 are "1" and dsp 618 is 0, the adaptive state machine 609 may assert UP2=1, setting DN2=0, and causing Drefp 616 to be increased, because the reference level is below the desired data level.

Specifically, UP2 and DN2 are not updated until LF_det1=1 is detected. This assumes that adaptation has just begun and Drefp level 616 starts from the VCM voltage level, which can arbitrarily be defined as 0. At this point, Drefp 616 must be lower than the "proper" value, because Drefp is tied to the "−" input of the slicer 615 and therefore must be lower than the third consecutive "1." Based on these three pieces of information, UP2 signal 629 is asserted and increments DAC 636 by one voltage step. This continues as long as Drefp has not yet reached the proper value.

When the Drefp 616 reaches the VCID3 level, the system will still be in a mode of increasing Drefp 616, and so Drefp 616 will go higher than the VCID3 level. In this state, when LF_det1=1, dsp 618 will be "0" because Drefp 616, on the "−" input, is now higher than the signal level. Adaptive state machine 609 sees this and asserts DN2 signal 629, which decrements the output of DAC 636 by one voltage step.

At this point, one should see a series of UP2 assertions followed by a number of DN2 assertions. The number of UP2 and DN2 assertions should be roughly equal in number when a stable solution is reached. Thus, this embodiment might more appropriately be described as metastable, always either increasing or decreasing Drefp 616.

Once Drefp level 616 (and Drefn level 626, if used) is set properly, the amount of equalization boost may be set using the second loop. This loop may run at a different update rate, because if the loops update at the same rate they may interfere with each other. Preferably the update rate is lower than the update rate of the Drefp loop, as it is desirable for the reference level to settle sooner. Preferably, adaptive state machine 609 contains a counter (not shown) to count the number of times Drefp 616 has been updated before it will update EQCTRL signal 623. This would make it more likely that Drefp 616 is stable before an update of EQCTRL signal 623 is attempted. In such an embodiment, the required counter value preferably would be programmable.

Remembering that more boost is required by high-frequency data, because signals representing such data otherwise never get a chance to reach the reference level before they change again, the data is examined for high-frequency events. For example, one can define HF_det1 to go high after a data pattern of X001X, where "X" means "don't care." This would detect any change to "1" after at least two 0's. Alternatively, it could be set to detect any change to "1" after at least three 0's (X0001X). Still another alternative would be a lone "1" following at least two 0's (X0010), with the latter requirement eliminating cases where the data is alternating between "1" and "0". Preferably the requirements could be user-programmable. The user might take into account backplane characteristics as well as the nature of equalizer block 603.

The second loop operates similarly to the first loop, after the first loop has set Drefp 616. Specifically, UP and DN are not updated until HF_det1=1 is detected. At this point, data 608 will be lower than Drefp 616. Therefore, dsp 618 will be "0" when HF_det1=1, and therefore UP signal 619 will be asserted to increment DAC 613 by one voltage step. This will continue as long as data 608 have not yet reached Drefp 616.

If the data 608 have reached or exceeded Drefp 616 when HF_det1=1, dsp 618 also will be "1". Adaptive state machine 609 will see this and assert DN signal 619, to decrement the output of DAC 613 by one voltage step.

At this point, one should see a series of UP assertions followed by a number of DN assertions. The number of UP and DN assertions should be roughly equal in number when a stable solution is reached. Again, this embodiment might more appropriately be described as metastable, always either increasing or decreasing EQCTRL 623.

As stated above, the two loops preferably should operate at different rates so that they do not interfere with one another.

Preferably, the reference level loop may operate more frequently than the equalization control loop, although it need not be a high-frequency loop in any absolute sense. The processing rate can be made as low as necessary for the circuitry to handle it, which is helped by processing in the parallel domain as also described above. An important criterion is how often it is desired to update the reference level. Updates may not be necessary every time a data pattern is detected. Depending on the application, it may be sufficient to update after every nth detection of the pattern, where n is programmable.

Other parameters also may be programmable. For example, the patterns which indicate low- and high-frequency data, and the run lengths of those patterns, may be programmable. Similarly, whichever loop operates at a lower frequency may include a programmable counter to set the number of times that the faster loop must converge before the slower loop will activate.

As long as the voltage steps in DACs 613, 636 are made small enough, the described embodiment may be expected to be immune to process mismatches in the fabrication of the DACs. The steps need not be exact, only small enough to avoid significant changes in the bit error rate because of abrupt changes in the equalization curve. In typical serial systems, the bit error rate may be about one in $10^{12}$, and the steps therefore should be small enough that the bit error rate remains at that order of magnitude.

The described embodiment also may be expected to be immune to drift based on incorrect data. Previous approaches required the "proper" transition densities, and if improper data were received the adapted value would drift from the ideal value. Also, repeating patterns of CID, such as "101010 . . . " or "11001100 . . . ", would cause problems because they appear as only one frequency tone in the frequency domain and would not give enough information for proper decisions. The described embodiments would ignore such patterns, because they have insufficient low-frequency content.

Thus it is seen that a programmable adaptive equalizer operating in the digital domain has been provided.

Figure 7:
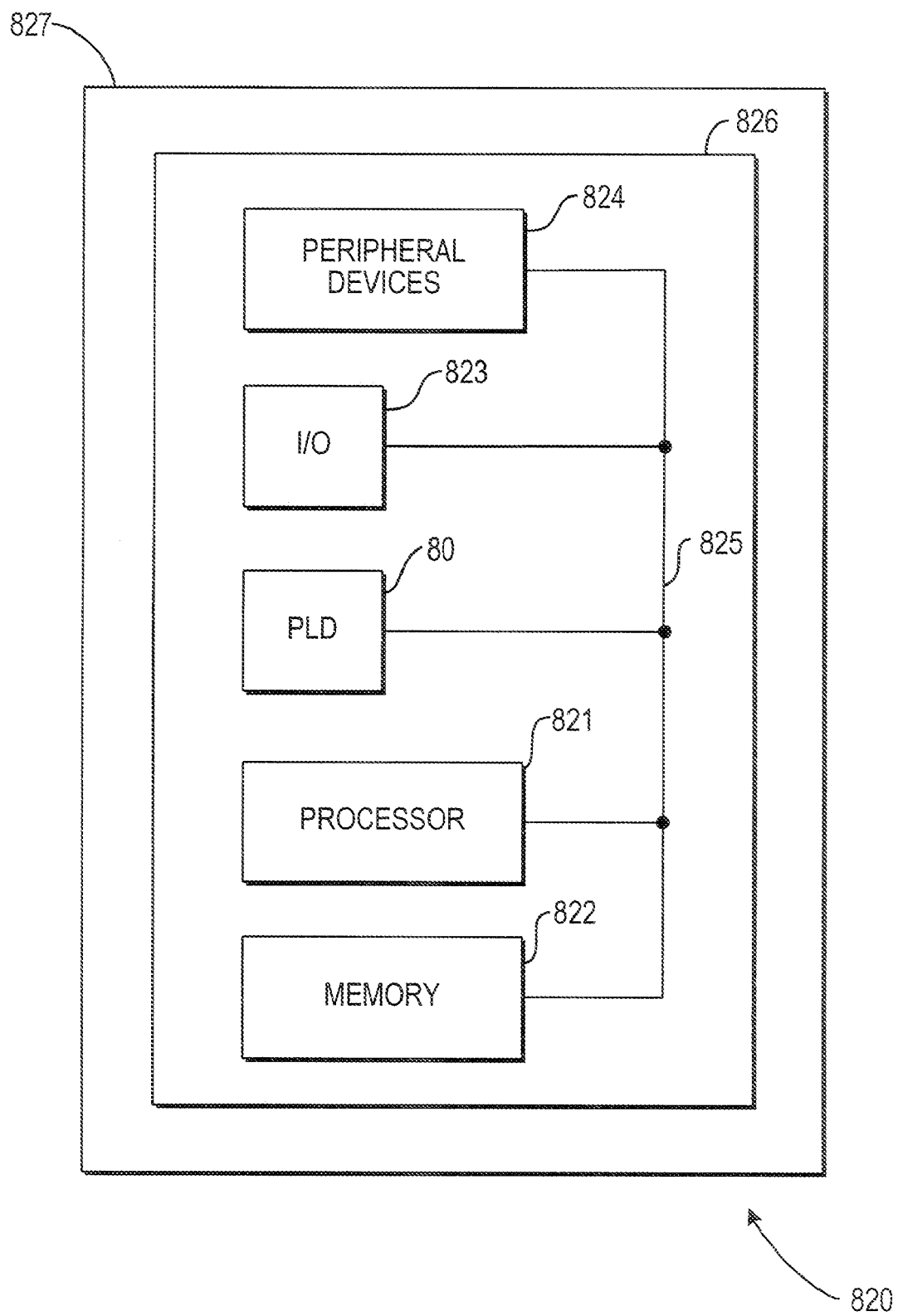
FIG. 7 is a simplified block diagram of an illustrative system employing a programmable logic device incorporating the present invention.

A PLD 80 incorporating the present invention may be used in many kinds of electronic devices. One possible use is in a data processing system 820 shown in FIG. 7. Data processing system 820 may include one or more of the following components: a processor 821; memory 822; I/O circuitry 823; and peripheral devices 824. These components are coupled together by a system bus 825 and are populated on a circuit board 826 which is contained in an end-user system 827.

System 820 can be used in a wide variety of applications, such as computer networking, data networking, instrumentation, video processing, digital signal processing, or any other application where the advantage of using programmable or reprogrammable logic is desirable. PLD 80 can be used to perform a variety of different logic functions. For example, PLD 80 can be configured as a processor or controller that works in cooperation with processor 821. PLD 80 may also be used as an arbiter for arbitrating access to a shared resources in system 820. In yet another example, PLD 80 can be configured as an interface between processor 821 and one of the other components in system 820. It should be noted that system 820 is only exemplary, and that the true scope and spirit of the invention should be indicated by the following claims. For example, other instances of system 820 may include other types of programmable integrated circuits that incorporate the present invention instead of or in addition to the PLD 80 and/or processor 821.

Various technologies can be used to implement PLDs 80 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. Adaptive equalization circuitry comprising: an equalization function block having a first input for serial input data, a second input for controlling an equalization function of said equalization function block, and an output for equalized data; data digitization circuitry operable to convert said equalized data to digitized output data; and adaptive compensation circuitry operable to generate an adaptation control signal to apply to said second input to control said equalization function, said adaptive compensation circuitry comprising: a first loop operable to digitally extract a first reference level and a second reference level from said equalized data; a second loop operable to digitally generate said adaptation control signal from said equalized data and said first reference level; and digital processing circuitry in said first and second loops, said digital processing circuitry operable to: extract said first reference level and generate said adaptation control signal based on at least one programmed pattern; and control the output of the equalization function block based on the first reference level and the second reference level.

2. The adaptive equalization circuitry of claim 1 wherein: said digitized output data are input to said digital processing circuitry; said first loop comprises: reference digitization circuitry that compares said input data to said first reference level to provide digitized reference data to said digital processing circuitry, and a reference digital-to-analog converter controlled by said digital processing circuitry to generate said first reference level; and said digital processing circuitry compares said digitized reference data and said digitized output data according to a first one of said at least one programmed pattern to generate a reference control signal that controls said reference digital-to-analog converter.

3. The adaptive equalization circuitry of claim 2 wherein: said digital processing circuitry compares said digitized output data to said first one of said at least one programmed pattern to generate a first signal indicating that said digitized output data are in a state of low-frequency change; said digital processing circuitry compares said digitized reference data to said digitized output data when said first signal indicates that said digitized output data are in a state of low-frequency change; and said digital processing circuitry generates said reference control signal to increase said first reference level when said digitized reference data are in a first state relative to said digitized output data, and generates said reference control signal to decrease said first reference level when said digitized reference data are in a second state relative to said digitized output data.

4. The adaptive equalization circuitry of claim 3 wherein:
in said first state, said digitized reference data have a magnitude less than said digitized output data; and
in said second state, said digitized reference data have a magnitude greater than said digitized output data.

5. The adaptive equalization circuitry of claim 2 wherein:
said second loop comprises an equalization digital-to-analog converter controlled by said digital processing circuitry to generate said adaptation control signal; and
said digital processing circuitry compares said digitized output data to a second one of said at least one programmed pattern to generate an equalization control signal that controls said equalization digital-to-analog converter.

6. The adaptive equalization circuitry of claim 5 wherein:
said digital processing circuitry compares said digitized output data to said second one of said at least one programmed pattern to generate a second signal indicating that said digitized output data are in a state of high-frequency change;
said digital processing circuitry compares said digitized reference data to said digitized output data when said second signal indicates that said digitized output data are in a state of high-frequency change; and
said digital processing circuitry generates said equalization control signal to increase said equalization function when said digitized reference data are in a third state relative to said digitized output data, and generates said equalization control signal to decrease said equalization function when said digitized reference data are in a fourth state relative to said digitized output data.

7. The adaptive equalization circuitry of claim 6 wherein:
in said third state, said digitized reference data have a magnitude less than said digitized output data; and
in said fourth state, said digitized reference data have a magnitude greater than said digitized output data.

8. The adaptive equalization circuitry of claim 2 wherein:
each of said data digitization circuitry and said reference digitization circuitry further comprises respective deserialization circuitry.

9. The adaptive equalization circuitry of claim 1 wherein said digital processing circuitry is programmable.

10. The adaptive equalization circuitry of claim 9 wherein said digital processing circuitry comprises a programmable state machine.

11. The adaptive equalization circuitry of claim 1 wherein said first and second loops operate at different rates from one another.

12. The adaptive equalization circuitry of claim 11 wherein said first loop operates at a higher rate than said second loop.

13. The adaptive equalization circuitry of claim 11 wherein both said different rates are slower than said input data.

14. The method of claim 1, wherein the output of the equalization function block is controlled to remain between the first reference level and the second reference level.

15. An adaptive equalization method for equalizing serial input data in a serial interface, said adaptive equalization method comprising:
equalizing said serial input data under control of an adaptation control signal to provide equalized output data;
digitally processing said equalized output data according to at least one programmed pattern to extract a first reference level and a second reference level; controlling said equalization output data based on said extracted first reference level and second reference level; and digitally processing said equalized output data and said first reference level according to one of said at least one programmed pattern to generate said adaptation control signal.

16. The adaptive equalization method of claim 15 wherein said digitally processing said equalized output data to extract a first reference level comprises: digitizing said equalized output data and comparing said digitized output data to a first one of said at least one programmed pattern to generate a first signal indicating that said digitized output data are in a state of low-frequency change; comparing said digitized reference data to said digitized output data when said first signal indicates that said digitized output data are in a state of low-frequency change; and increasing said first reference level when said digitized reference data are in a first state relative to said digitized output data, and decreasing said first reference level when said digitized reference data are in a second state relative to said digitized output data.

17. The adaptive equalization method of claim 16 wherein:
in said first state, said digitized reference data have a magnitude less than said digitized output data; and
in said second state, said digitized reference data have a magnitude greater than said digitized output data.

18. The adaptive equalization method of claim 16 further comprising comparing said digitized output data to a second one of said at least one programmed pattern to generate said adaptation control signal.

19. The adaptive equalization circuitry of claim 18 wherein:
said comparing said digitized output data to said second one of said at least one programmed pattern to generate said adaptation control signal comprises comparing said digitized output data to said second one of said at least one programmed pattern to generate a second signal indicating that said digitized output data are in a state of high-frequency change; said method further comprising:
comparing said digitized reference data to said digitized output data when said second signal indicates that said digitized output data are in a state of high-frequency change; and
increasing said equalization function when said digitized reference data are in a third state relative to said digitized output data, and decreasing said equalization function when said digitized reference data are in a fourth state relative to said digitized output data.

20. The adaptive equalization method of claim 19 wherein:
in said third state, said digitized reference data have a magnitude less than said digitized output data; and
in said fourth state, said digitized reference data have a magnitude greater than said digitized output data.

21. An integrated circuit device comprising:
programmable circuitry; a serial interface; and adaptive equalization circuitry for use in said serial interface, said adaptive equalization circuitry comprising: an equalization function block having a first input for serial input data, a second input for controlling an equalization function of said equalization function block, and an output for equalized data, data digitization circuitry operable to convert said equalized data to digitized output data, and adaptive compensation circuitry operable to generate an adaptation control signal to apply to said second input to control said equalization function, said adaptive compensation circuitry comprising: a first loop operable to digitally extract a first reference level and a second reference level from said equalized data, a second loop operable to digitally generate said adaptation control signal from said equalized data and said first reference level, and digital processing circuitry in said first and second loops, said digital processing circuitry operable to: extract said first reference level and generate said adaptation control signal based on at least one programmed pattern; and control the output of the equalization function block based on the first extracted reference level and the second reference level.

22. The integrated circuit device of claim 21 wherein: said digital processing circuitry digitally compares said output data to a first one of said at least one programmed pattern to generate a first signal indicating that said output data are in a state of low-frequency change; said digital processing circuitry digitally compares said reference data to said output data when said first signal indicates that said output data are in a state of low-frequency change; and said digital processing circuitry generates said reference control signal to increase said first reference level when said reference data are in a first state relative to said output data, and generates said reference control signal to decrease said first reference level when said reference data are in a second state relative to said output data.

23. The integrated circuit device of claim 22 wherein:
in said first state, said reference data have a magnitude less than said output data; and
in said second state, said reference data have a magnitude greater than said output data.

24. The integrated circuit of claim 22 wherein:
said digital processing circuitry digitally compares said output data to a second one of said at least one programmed pattern to generate a second signal indicating that said output data are in a state of high-frequency change;
said digital processing circuitry digitally compares said reference data to said output data when said second signal indicates that said output data are in a state of high-frequency change; and
said digital processing circuitry generates said equalization control signal to increase said equalization function when said reference data are in a third state relative to said output data, and generates said equalization control signal to decrease said equalization function when said reference data are in a fourth state relative to said output data.

25. The integrated circuit device of claim 21 wherein said adaptive equalization circuitry is programmable.

26. The integrated circuit device of claim 21 wherein said integrated circuit device is a programmable logic device.

* * * * *